United States Patent
Bailey et al.

(10) Patent No.: US 11,110,492 B2
(45) Date of Patent: Sep. 7, 2021

(54) PLUNGER CARD FOR CLEANING CURRENCY HANDLING DEVICE

(71) Applicant: KICTeam, Inc., Auburn, ME (US)

(72) Inventors: Glen Bailey, Litchfield, ME (US); Geoffrey Scott Caron, Sabattus, ME (US); Ian McCormick, Yarmouth, ME (US); John Condon, Summer, ME (US); Byron Mehl Kern, II, Cumberland Foreside, ME (US); Kenneth Monroe Pedersen, III, Auburn, ME (US)

(73) Assignee: KICTEAM, INC., Auburn, ME (US)

( * ) Notice: Subject to any disclaimer, the term of this patent is extended or adjusted under 35 U.S.C. 154(b) by 0 days.

(21) Appl. No.: 16/441,561

(22) Filed: Jun. 14, 2019

(65) Prior Publication Data
US 2019/0381538 A1    Dec. 19, 2019

Related U.S. Application Data

(60) Provisional application No. 62/685,341, filed on Jun. 15, 2018.

(51) Int. Cl.
| | | |
|---|---|---|
| *B08B 1/00* | (2006.01) | |
| *B08B 7/00* | (2006.01) | |
| *G06K 13/08* | (2006.01) | |

(52) U.S. Cl.
CPC ............ *B08B 1/005* (2013.01); *B08B 7/0028* (2013.01); *G06K 13/0868* (2013.01)

(58) Field of Classification Search
CPC .... G06K 19/0868; G06K 19/02; G06K 13/04; B41J 29/17

USPC .................................................. 235/441, 449
See application file for complete search history.

(56) References Cited

U.S. PATENT DOCUMENTS

| | | | |
|---|---|---|---|
| 5,227,844 A | 7/1993 | Bhattacharjee et al. | |
| 5,525,417 A | 6/1996 | Eyler | |
| 6,107,221 A | 8/2000 | Nakajima et al. | |
| 7,540,055 B1 | 6/2009 | Bailey | |
| 7,631,390 B1 | 12/2009 | Klein et al. | |
| 7,732,040 B2 | 6/2010 | Klein et al. | |
| 8,323,779 B2 | 12/2012 | Bailey et al. | |
| 2005/0210610 A1* | 9/2005 | Louie | B41J 29/17 |
| | | | 15/102 |
| 2005/0242195 A1* | 11/2005 | McCance | G06K 19/02 |
| | | | 235/487 |
| 2005/0266211 A1* | 12/2005 | Klein | G06K 19/02 |
| | | | 428/174 |
| 2006/0019072 A1 | 1/2006 | Bailey et al. | |

(Continued)

FOREIGN PATENT DOCUMENTS

| | | |
|---|---|---|
| JP | H11290790 A | 10/1999 |
| JP | 2016107183 A | 6/2016 |

*Primary Examiner* — Allyson N Trail
(74) *Attorney, Agent, or Firm* — Fox Rothschild LLP

(57) ABSTRACT

A system and method for cleaning a media transport device includes a cleaning card having a first end portion and a second end portion. The system may also include a handled cleaning card holder. The handled cleaning card holder is configured to secure the cleaning card at a first end portion and allow access to the second end portion of the cleaning card for use in cleaning. The cleaning card may configured to be rotatable at least 180° within or upon the handled cleaning card holder, or it may be rotated by hand to be used in at least two directions.

25 Claims, 6 Drawing Sheets

(56) References Cited

U.S. PATENT DOCUMENTS

| | | | |
|---|---|---|---|
| 2007/0026198 A1* | 2/2007 | Bouchard | B08B 1/00 428/174 |
| 2008/0179400 A1* | 7/2008 | Jenner | A47L 25/00 235/449 |
| 2010/0119765 A1* | 5/2010 | Kabis | G06K 13/0893 428/90 |
| 2011/0113578 A1* | 5/2011 | Akai | B08B 1/008 15/210.1 |
| 2015/0022615 A1* | 1/2015 | Fowell | B41J 35/38 347/220 |
| 2016/0082482 A1 | 3/2016 | LeCompte et al. | |
| 2019/0095767 A1* | 3/2019 | Bailey | G06K 13/04 |

* cited by examiner

PLUNGER CARD FOR CLEANING CURRENCY HANDLING DEVICE

RELATED APPLICATIONS AND CLAIM OF PRIORITY

This patent document claims priority to U.S. provisional patent application No. 62/685,341, filed Jun. 15, 2018. The disclosure of the priority application is fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include currency handling devices (e.g., teller cash recyclers), coupon printers, ticket printers, ticket-taking devices, and other printed media handling systems.

Because printed media can pass through a variety of human hands and environmental conditions before it is inserted into a media transport mechanism, printed media often is at least partially coated with dirt, oil and/or other contaminants. When the printed media passes through the media transport mechanism, the contaminants can transfer from the printed media to the mechanism's rollers, belts, other conveyors, and other components that contact the printed media. Over time, these contaminants can build up and cause the machine to malfunction.

The removal of contaminants from a media transport mechanism is a labor-intensive and time-consuming process. It requires a technician to open the device and carefully clean small parts by hand. Many of these parts are in small, hard-to-reach spaces. Thus, manual cleaning is difficult, and it is not always effective.

Furthermore, the reliance upon a trained technician to perform the cleaning tasks generally leads to the media transport mechanisms being cleaned less frequently, thereby increasing the likelihood of additional contaminant build-up. For example, in a teller cash recycler device, an individual bank teller is not able to access the interior of the device, leaving the feeder area of the device as their only access to the media transport mechanism(s) within. Thus, without access to the interior of the device, the bank teller and/or other bank personnel is unable to clean the media transport mechanisms of the teller cash recycler device with desired regularity. As the feeder area is the sole point of entry/exit on the device utilized by the bank tellers, the media transport mechanisms may quickly become contaminated with dirt and debris, potentially leading to malfunctions.

This document describes methods and systems directed to solving some of the issues described above, and/or other issues.

SUMMARY

In accordance with an aspect of the disclosure, a cleaning system for cleaning a currency transport device is disclosed. The cleaning system includes a cleaning card, wherein the cleaning card has a first end portion and a second end portion. The cleaning system also includes a handled cleaning card holder, wherein the handled cleaning card holder is configured to secure the cleaning card at a first end portion and allow access to the second end portion of the cleaning card for use in cleaning. Additionally, the cleaning card is configured to be rotatable at least 180° within or upon the handled cleaning card holder.

According to another aspect of the disclosure, a cleaning card for cleaning a currency transport device is disclosed. The cleaning card includes a first end portion having a first end, a second end portion having a second end, one or more cleaning strips extending between the first end and the second end, as well as one or more non-cleaning strips spaced between the one or more adhesive strips. The spacing of the one or more cleaning strips is configured to correspond to the spacing of one or more rollers within a feeder of the currency transport device.

In accordance with another aspect of the disclosure, a method of cleaning a feeder of a media transport device is disclosed. The method includes providing a handled cleaning card holder, and providing a cleaning card, the cleaning card having a first end portion and a second end portion. The method further includes inserting the second end portion of the cleaning card into the cleaning card holder, inserting the first end portion of the cleaning card into a user-accessible feeder of the media transport device, and repeatedly plunging the first end portion of the cleaning card into the feeder so as to at least partially clean roller surfaces within the feeder of the media transport device. Furthermore, the method includes removing the first end portion of the cleaning card from the feeder, rotating the cleaning card 180° on or within the handled cleaning card holder relative to a first insertion position of the cleaning card, inserting the second end portion of the cleaning card into the user-accessible feeder of the media transport device, repeatedly plunging the second end portion of the cleaning card into the feeder so as to at least partially clean roller surfaces within the feeder of the media transport device, and removing the second end portion of the cleaning card from the feeder.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of position such as "upper" and "lower", "horizontal", "vertical" and the like are intended to indicate relative positions with respect to the components for which those terms are descriptive, and are not intended to be absolute and require that the component remain in that absolute position in all configurations. Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "media transport system" and "media transport device" refer to a set of hardware components that are configured to receive printed media (i.e., a substrate onto which text and/or graphics have been printed) and move the printed media through one or more modules that perform various processing steps on the printed media, such as position adjustment, sensing, printing and/or delivery to a final destination. A "currency transport device" or "currency transport system" is a type of media transport device that is configured to process and convey printed financial instruments such as currency notes, checks, money orders, bank notes and the like. One example of a currency transport device is a teller cash recycler.

Figure 1:
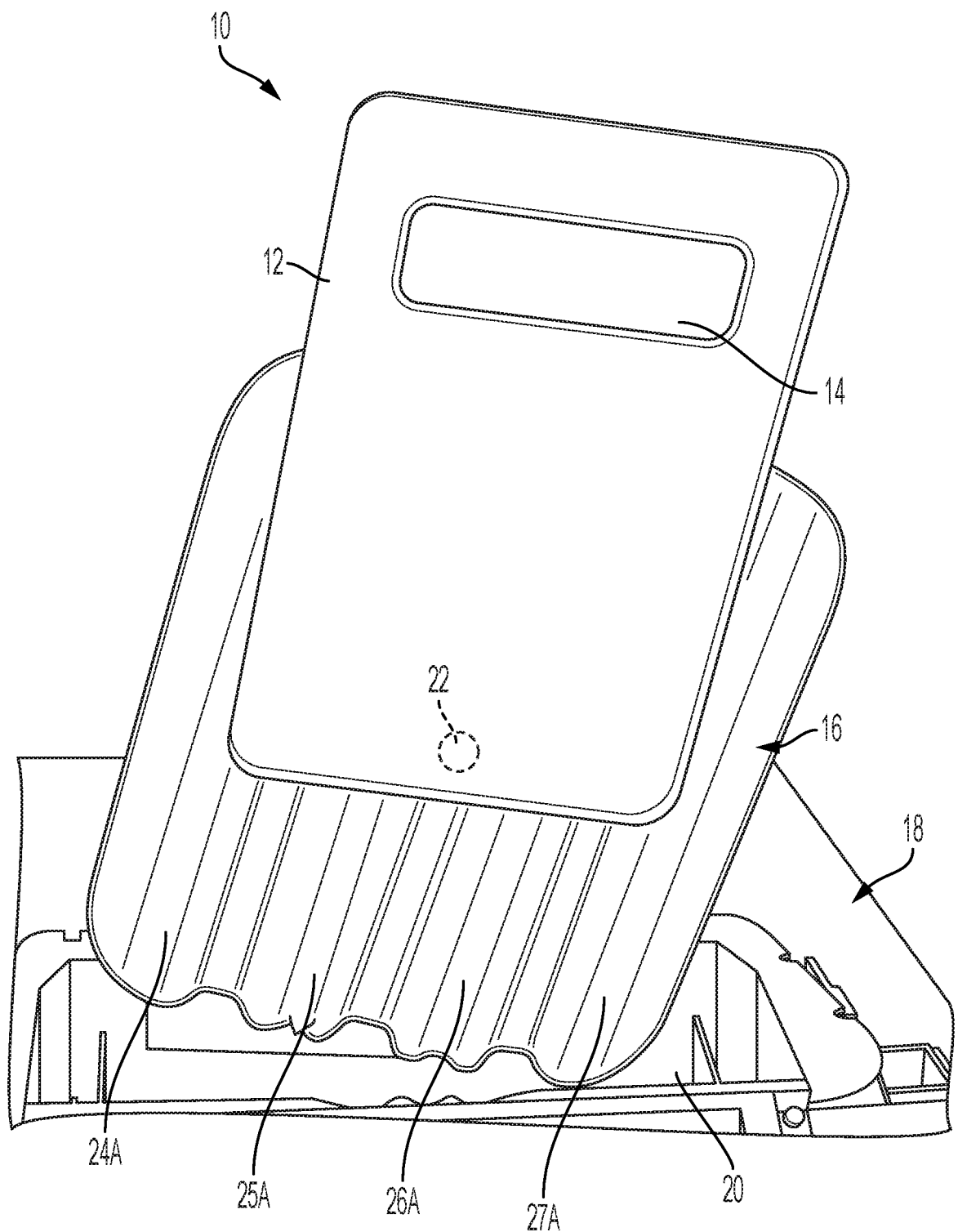
FIG. 1 illustrates a handled plunger card device for cleaning a currency handling device in accordance with an aspect of the disclosure.

FIG. 1 illustrates a handled plunger card device 10 in accordance with an aspect of the disclosure. As will be described further below, handled plunger card device 10 is configured to clean various rollers, sensors, and/or lenses within a feeder area of a media transport device such as, e.g., a currency transport device. For example, handled plunger card device 10 may be used to clean dirt and debris from the rollers within a feeder 20 of a teller cash recycler 18. However, it is to be understood that handled plunger card device 10 is not limited to use with currency transport devices, and may be utilized with various other media transport devices utilizing rollers, sensors, and/or lenses.

Referring still to FIG. 1, handled plunger card device 10 includes a handled cleaning card holder 12, which includes a user grip portion 14. Cleaning card holder 12 may be formed of any appropriate resilient material, such as, e.g., plastic, composites, metal, wood, etc. In most embodiments, cleaning card holder 12 is substantially non-flexible, thereby providing a supportive gripping surface to the user, as well as a supportive mount for a cleaning card 16. User grip portion 14 is shown as an opening formed in the cleaning card holder 12, wherein the opening is sized to allow all four of the user's fingers to fit within the grip portion 14 during use. However, it is to be understood that user grip portion 14 may be formed in other ways, such as, e.g., an elongated handle extending from one end of cleaning card holder 12.

Cleaning card 16 is coupled to cleaning card holder 12 about a single rotational axis 22, as shown in FIG. 1. More specifically, cleaning card 16 is rotatably coupled to cleaning card holder 12 in such a manner so as to allow for at least 180° of rotation about axis 22. For example, cleaning card holder 12 may include a pin or other extension at axis 22, which may interact with an existing or user-created hole or other opening (not shown) at a substantially central point on cleaning card 16, thereby allowing the cleaning card 16 to rotate about axis 22. In some aspects, cleaning card holder 12 is configured such that the cleaning card 16 is simply pressed onto a pin or other feature at axis 22 extending from one side of the cleaning card holder 12 (i.e., the side not visible in FIG. 1). However, in other aspects, the cleaning card holder 12 may be configured to have a substantially clamshell-type construction, with the cleaning card 16 being sandwiched between two different side surfaces, yet still rotatable about axis 22. In such a clamshell-type construction, one or more of the respective side surfaces may hinge relative to the other so as to allow for the cleaning card 16 to be inserted and/or removed.

Referring still to FIG. 1, cleaning card 16 is shown as having a plurality of spaced-apart cleaning strips 24A, 25A, 26A, 27A, with the segments of cleaning card 16 between cleaning strips 24A, 25A, 26A, 27A being different in texture and/or surface coating than cleaning strips 24A, 25A, 26A, 27A. More specifically, cleaning strips 24A, 25A, 26A, 27A represent the cleaning portions of a first end of cleaning card 16. The width and spacing of cleaning strips 24A, 25A, 26A, 27A, along with the overall width of cleaning card 16, is designed so as to correspond with the rollers within the feeder 20 of the teller cash recycler 18. Thus, as the user plunges the first end of cleaning card 16 into the feeder 20, the cleaning strips 24A, 25A, 26A, 27A only contact the rollers (or portions of the rollers) to clean dirt and debris from the rollers, leaving other areas within the feeder 20 untouched any cleaning material on the cleaning strips 24A, 25A, 26A, 27A such as, e.g., an adhesive material. In this way, the cleaning card 16 avoids transferring cleaning material to surfaces within the feeder 20 where it may be undesirable, as this may lead to additional unwanted buildup of dirt and debris in areas within the feeder 20 other than the rollers. Additionally, as is discussed above, the cleaning card 16 is not limited to use in cleaning the rollers of a teller cash recycler, but may be utilized to clean, e.g., rollers, sensors, and/or lenses of other devices.

In some embodiments, cleaning strips 24A, 25A, 26A, 27A may be configured as strips of adhesive material, thereby allowing the cleaning card to adhesively lift dirt and debris from the rollers within a feeder 20. However, in other embodiments, one or more of the plurality of cleaning strips 24A, 25A, 26A, 27A may be non-adhesive, and may be configured as, e.g., a plurality of dry cleaning strips, a plurality of absorbent strips, a plurality of scarifying strips, a plurality of strips pre-saturated with a cleaning agent, etc. Additionally, a cleaning card having any combination of the cleaning strips described above may also be used.

Furthermore, while four cleaning strips 24A, 25A, 26A, 27A are shown, it is to be understood that cleaning card 16 may utilize more or fewer cleaning strips. In some embodiments, the cleaning card 16 may alternatively be configured to have no distinct cleaning strips, and may instead be entirely covered with the selected cleaning coating and/or texture.

Figure 3:
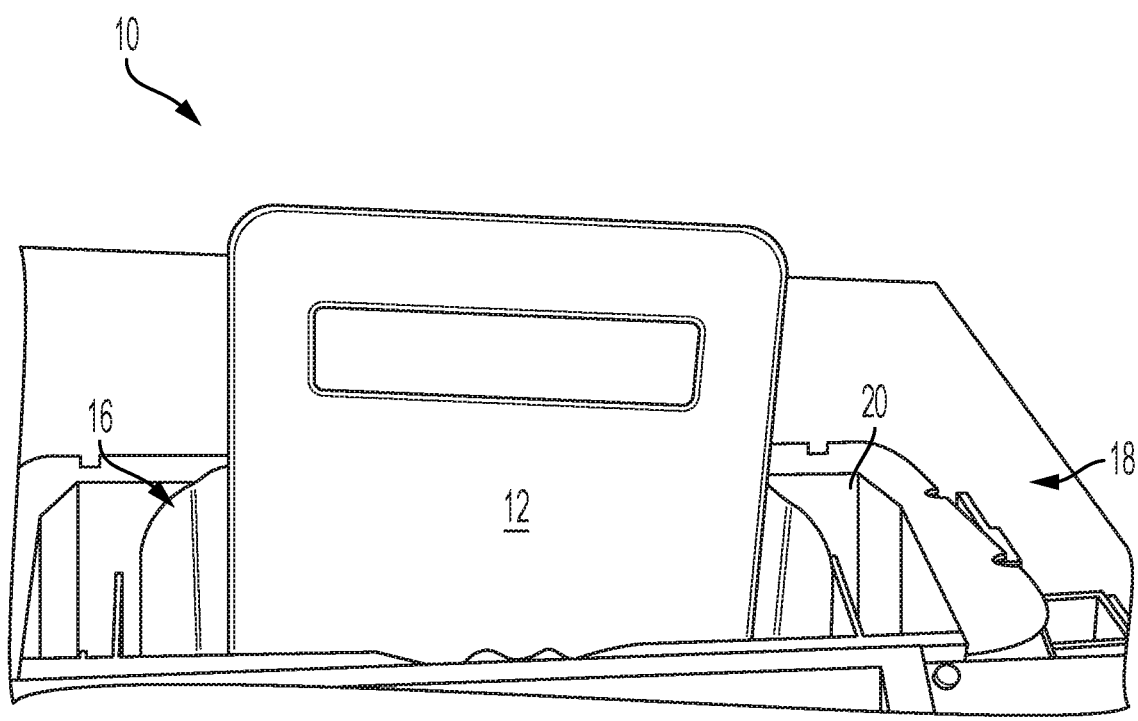
FIG. 3 illustrates the handled plunger card device of FIG. 1 inserted into a currency handling device.

As noted above, during a cleaning operation, the user grips the cleaning card holder 12 and inserts the cleaning card 16 into the roller section of feeder 12, as is shown in FIG. 3. The user may then repeatedly plunge the cleaning card 16 in and out of the feeder 20, allowing the cleaning strips 24A, 25A, 26A, 27A on the first end of the cleaning card 16 to clear at least a portion of the rollers of any accumulated dirt and debris. As the user continues to plunge the cleaning card 16 into feeder 20, though, the cleaning strips 24A, 25A, 26A, 27A may begin to lose their adhesive properties and/or dirt and debris may build up on the cleaning strips 24A, 25A, 26A, 27A themselves, detrimentally affecting their cleaning properties.

Figure 2:
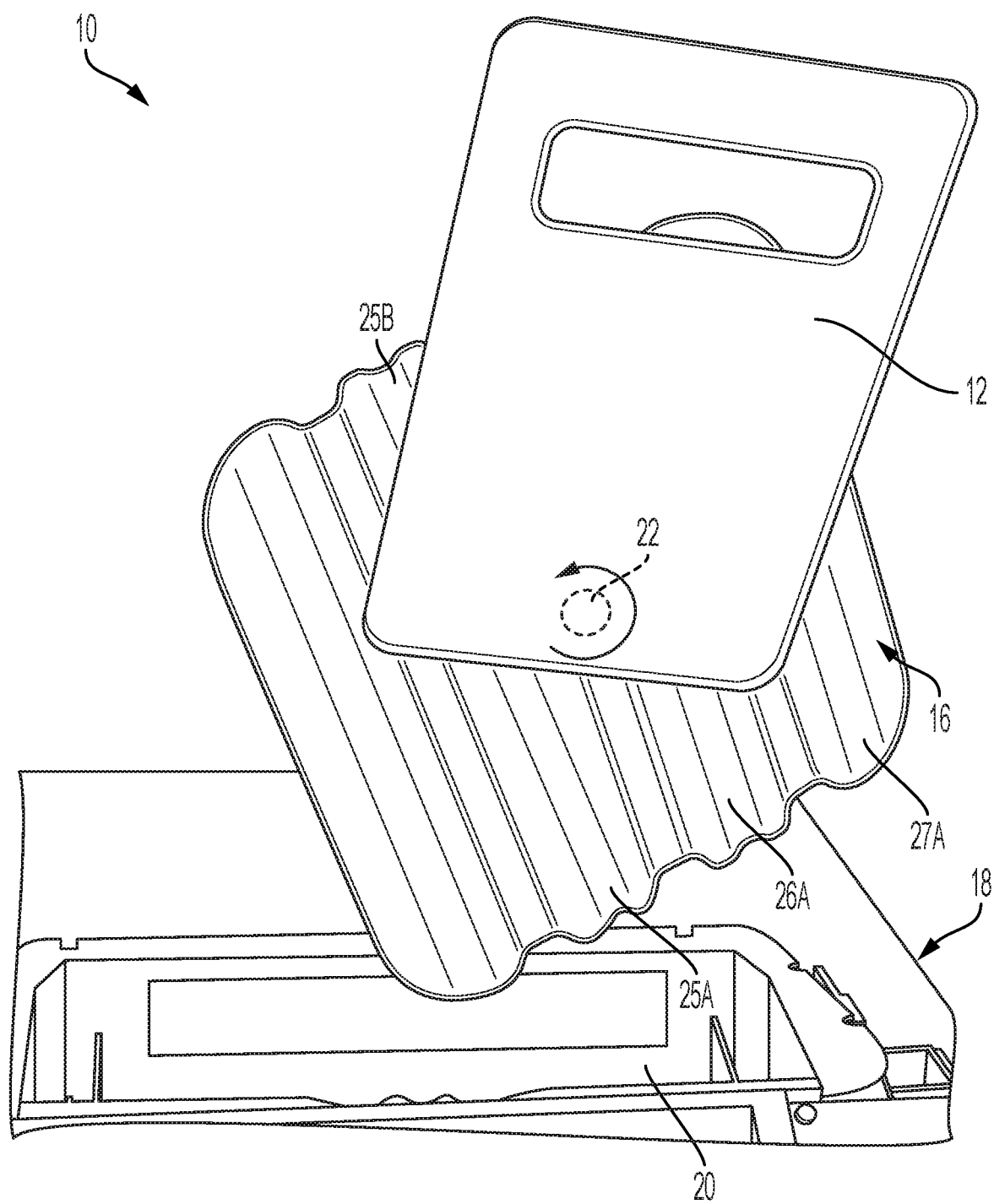
FIG. 2 illustrates the handled plunger card device of FIG. 1 in a partially rotated configuration.

However, as is illustrated in FIG. 2, cleaning card 16 is configured to be rotatable at least 180° about axis 22, thereby allowing for a second end of cleaning card 16 to be moved into a usable position relative to cleaning card holder 12. That is, rotation of cleaning card 16 in this way exposes another, unused portion of the cleaning strips (e.g., cleaning strip 25B shown in FIG. 2). Thus, after the user has repeatedly plunged the cleaning card 16 into the feeder 20 for a first period of time, allowing dirt and debris to build up on cleaning strips 24A, 25A, 26A, 27A, the user may simply rotate cleaning card 16 about axis 22, finishing the cleaning operation using clean, unused sides of the cleaning strips on the second end portion of the cleaning card 16. Such a configuration is useful in the cleaning of rollers and other rotary components, as the plunging action used to clean may need to be repeated numerous times in order to effectively clean all material-contacting surfaces of the rollers or other rotary components.

When the user has completed the cleaning operation to a desired level, the cleaning card 16 may simply be removed from the cleaning card holder 12 and discarded. The cleaning card 16 may be provided with a single peel cover over the cleaning strips, which is removable prior to use. Alternatively, each cleaning strip may include its own peel cover. Additionally, the cleaning strips may be located on only one side surface of cleaning card 16 or, in other embodiments, both side surfaces of cleaning card 16 may include cleaning strips.

Figure 4:
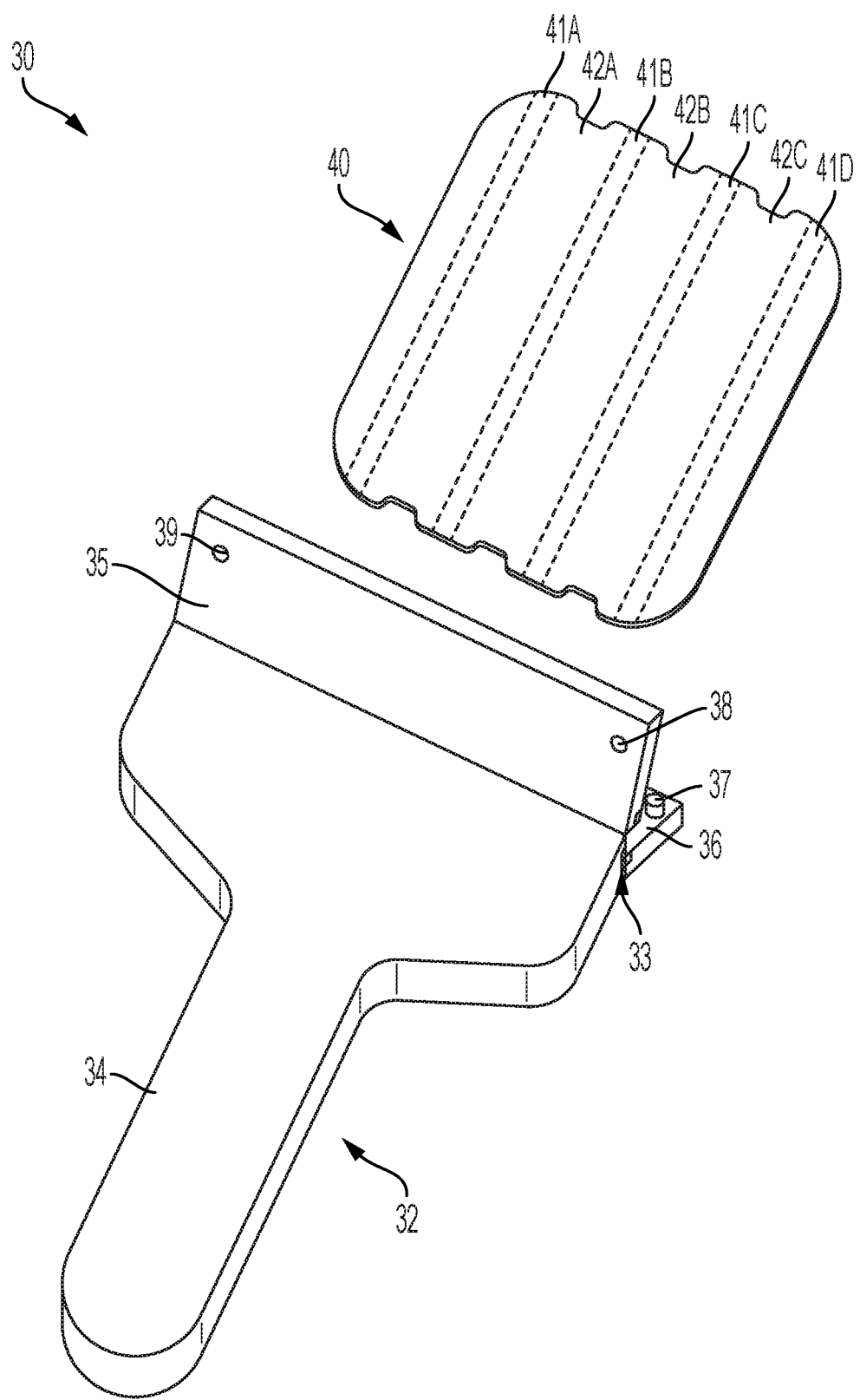
FIG. 4 illustrates a handled plunger card device for cleaning a currency handling device in an open configuration in accordance with another aspect of the disclosure.
Figure 5:
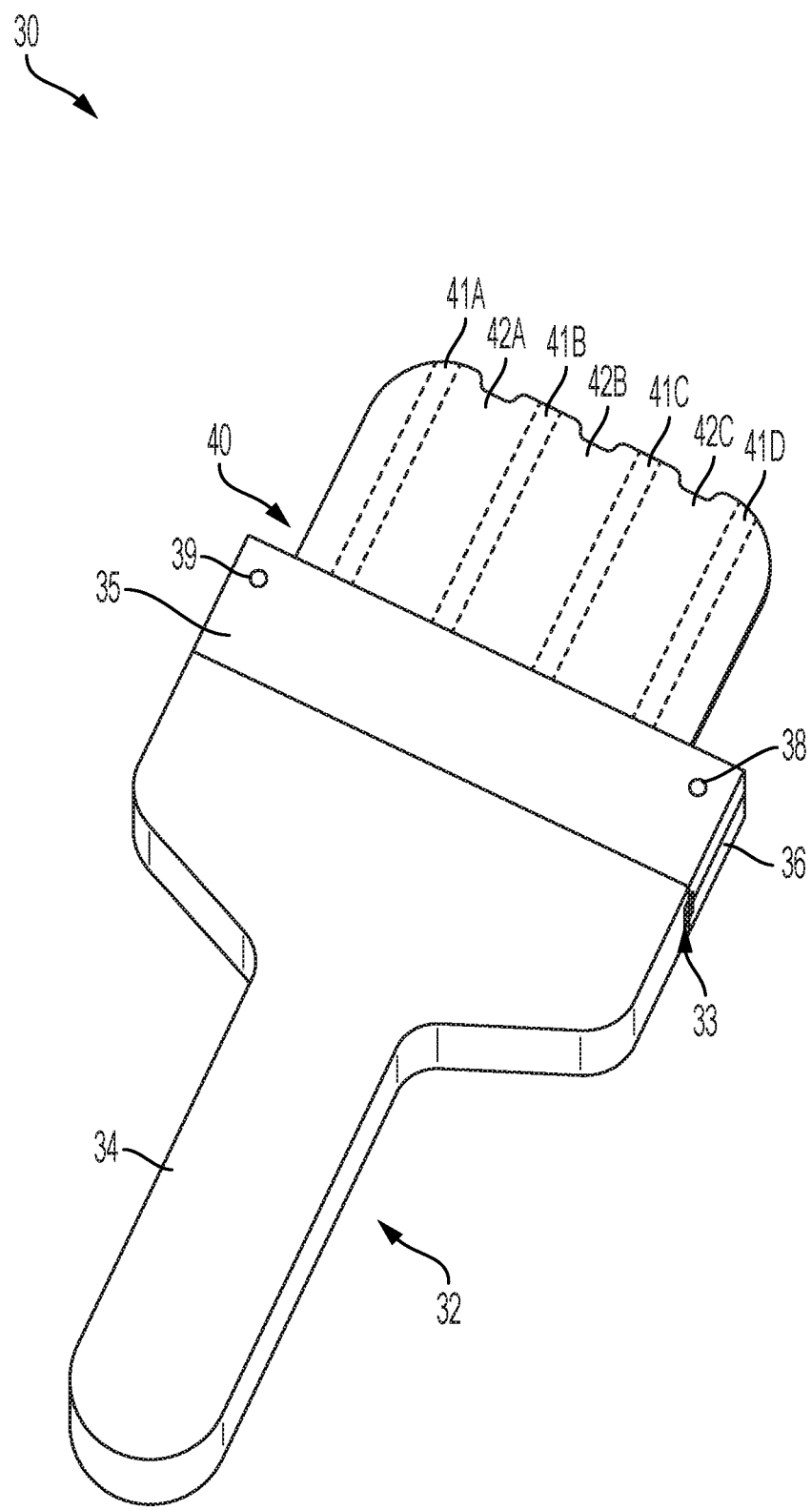
FIG. 5 illustrates the handled plunger card device of FIG. 5 in a closed configuration.

Referring now to FIGS. 4-5, a handled plunger card device 30 in accordance with another aspect of the disclosure is illustrated. Unlike handled plunger card device 10 described above with respect to FIGS. 1-3, which relied upon a single axis to allow rotation of a cleaning card, handled plunger card device 30 instead relies upon a cleaning card holder 32 having a hinged, clamshell-type card holder configuration to support respective ends of a cleaning card 40.

Specifically, as is shown in FIG. 4, cleaning card holder 32 includes an elongated handle 34, which allows a user to securely grip the cleaning card holder 32. While shown with an elongated handle 34, it is to be understood that cleaning card holder 32 may instead utilize another grip configuration, such as, e.g., an opening in cleaning card holder 32 sized to allow access to the user's fingers, similar to that which is shown in FIGS. 1-3. Cleaning card holder 32 further comprises a pair of securing members 35, 36, wherein at least one of securing members 35, 36 is hinged relative to the other of securing members 35, 36 via a hinge 33, thereby allowing the securing members 35, 36 to open and close in relation to one another. When in a closed position, the securing members 35, 36 may be securely held together via, e.g., one or more pins 37 extending from one interior surface of one of the securing members 35, 36, which are sized and configured to securely engage with holes 38, 39 on the other of the securing members 35, 36. However, it is to be understood that other means of holding securing members 35, 36 may be utilized, such as, e.g., hook-and-loop fasteners, snaps, etc.

As is shown in FIG. 5, when the user places a cleaning card 40 between the securing members 35, 36 and securing members 35, 36 are held together, cleaning card 40 is similarly secured between securing members 35, 36, with only a first end of cleaning card 40 accessible for use in a cleaning operation. Then, using the plunging methods described above with respect to FIGS. 1-3, the user may clean rollers or other components within a feeder. However, if and when the first end of cleaning card 40 becomes soiled or unusable, rather than rotate the cleaning card 40 about a single axis, the user instead separates securing members 35, 36 from one another, manually rotates the cleaning card 40 to expose the second end of cleaning card 40, and places the cleaning card 40 back between the securing members 35, 36 such that the unused, second end of cleaning card 40 is exposed for further cleaning operations. Once both ends of the cleaning card 40 are deemed unusable or the cleaning operation is completed, the user may simply separate securing members 35, 36, releasing the cleaning card for appropriate disposal.

Referring again to FIG. 4, cleaning card 40 is illustrated as having a construction similar to cleaning card 16 described above, with a plurality of cleaning strips 41A, 41B, 41C, 41D extending the entire length of cleaning card 40, and a plurality of non-cleaning segments 42A, 42B, 42C spaced between the respective cleaning strips. In this way, cleaning card 40 is configured such that the cleaning strips 41A, 41B, 41C, 41D are sized and spaced to correspond to, e.g., the rollers, sensors, lenses, or other components of a feeder that are desired to be cleaned, thereby preventing cleaning material from contacting undesirable areas within the feeder. It is to be understood that the number and/or size of the cleaning strips, and the size of the cleaning card in general, may be altered dependent upon the precise media transport mechanism(s) to be cleaned.

In some embodiments, cleaning strips 41A, 41B, 41C, 41D may be configured as strips of adhesive material, thereby allowing the cleaning card to adhesively lift dirt and debris from the rollers of a media transport mechanism to be cleaned. However, in other embodiments, one or more of the cleaning strips 41A, 41B, 41C, 41D may be non-adhesive, and may be configured as one or more dry cleaning strips, one or more absorbent strips, one or more scarifying strips, one or more strips pre-saturated with a cleaning agent, etc. Additionally, a cleaning card having any combination of the cleaning strips described above may also be used.

In some embodiments, cleaning strips 41A, 41B, 41C, 41D may be configured as strips of abrasive material, while non-cleaning segments 42A, 42B, 42C may be include a non-abrasive material. In still other embodiments, cleaning strips 41A, 41B, 41C, 41D may be configured as strips of material having an array of raised dots, while non-cleaning segments 42A, 42B, 42C may be include a non-raised surface.

In still further embodiments, cleaning strips 41A, 41B, 41C, 41D may be configured to include a plurality of discrete raised areas, while non-cleaning segments 42A, 42B, 42C may include no discrete raised areas. Each of the plurality of discrete raised areas slopes such that an apex (or peak) is formed relative to a substrate portion of the cleaning card, as is shown and described in U.S. Pat. Nos. 7,732,040, 7,846,534, and/or 8,323,779, each of which is incorporated herein by reference in their entirety. With this configuration, the plurality of discrete raised areas formed along the plurality of cleaning strips 41A, 41B, 41C, 41D may allow for the effective cleaning of, e.g., rollers, sensors, lenses, or other components at or near the feeder, even if these components are spaced a distance farther from the feeder than the maximum thickness of the substrate portion of the cleaning card that can be received within the feeder. That is, the plurality of discrete raised areas may compress when the cleaning card is inserted into the feeder, but may expand once through the opening so as to contact and clean the rollers, sensors, lenses, and/or other components.

In accordance with another aspect of the disclosure, cleaning strips 41A, 41B, 41C, 41D may be configured to include a plurality scarifying holes, such as those shown and described in U.S. Pat. No. 10,189,650, which is incorporated herein by reference in its entirety. The scarifying holes may be positioned to align over, under, or in between rollers, sensors, lenses, and/or other components of the device to be cleaned, with each scarifying hole having an opening configured to provide at least one scraping edge. In this way, debris or other contaminants may be scraped (and thus removed) from the component surface via movement of the cleaning card, movement of the component, or both. Similar to the embodiments described above, the non-cleaning segments 42A, 42B, 42C non-cleaning segments 42A, 42B, 42C.

Additionally and/or alternatively, rather than rotating the cleaning card 40 so as to expose unused cleaning portions, handled plunger card device 30 may instead be configured to use smaller, single-use cleaning cards. In these configurations, the cleaning cards may simply be disposed of when the cleaning properties are no longer effective or the card is soiled, with a new cleaning card being inserted to complete the cleaning operations.

Furthermore, while not shown in any of FIGS. 1-5, it is to be understood that the cleaning strips (e.g., cleaning strips 41A, 41B, 41C, 41D) may be mounted or affixed on the cleaning card in such a way as to be slightly offset from the surface of the cleaning card, thereby further preventing the non-cleaning portions (e.g., non-cleaning segments 42A, 42B, 42C) from contacting undesirable portions of the feeder. The cleaning cards may be formed of any appropriate material, such as, e.g., cardboard, plastic, etc.

While cleaning card 40 is shown for use in conjunction with a cleaning card holder 32, it is to be understood that, in some embodiments, a cleaning card 40 may be utilized without a cleaning card holder. That is, the user may directly hold the cleaning card 40 when performing the cleaning operation. Furthermore, while the cleaning operation using only a cleaning card 40 may incorporate the plunging action into a feeder of a media transport mechanism as described above, in some embodiments, a cleaning card 40 may be utilized to clean various aspects of the media transport mechanism in other ways. For example, a technician may utilize cleaning card 40 to clean other rollers and/or components that are not accessible directly via the feeder. In another embodiment, a cleaning card 40 could be manually or automatically fed through various portions of the media transport mechanism in order to perform cleaning operation. Accordingly, cleaning card 40 is not limited to use with a handled cleaning card holder, nor is cleaning card 40 limited to use in cleaning rollers accessible via a feeder.

Figure 6:
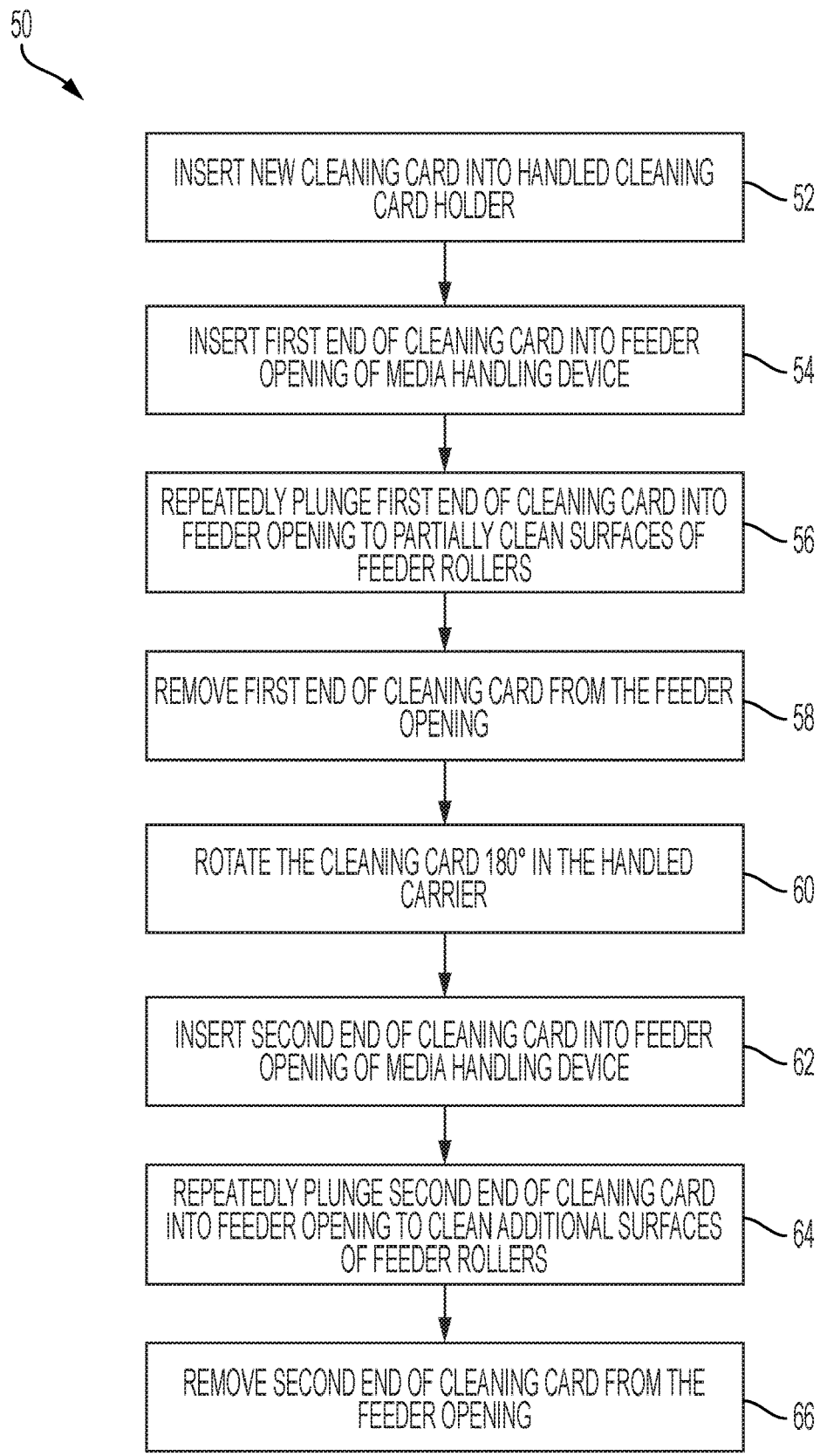
FIG. 6 illustrates a process by which a handled plunger card device in accordance with the aspects of the disclosure may clean the feeder rollers of a media transport system.

Next, referring to FIG. 6, a method 50 for using a handled plunger card device such as that described above is illustrated. The method includes inserting a new, unused cleaning card into or onto a handled cleaning card holder (step 52). As detailed above, the handled cleaning card holder may allow for at least partial rotation of the cleaning card about a single axis on the handled cleaning card holder, or may secure the cleaning card via a clamshell-type configuration. Next, a first exposed end portion of the cleaning card is inserted into an externally-accessible feeder of a media handling device (i.e., a currency handling device) (step 54).

After inserting the first end portion of the cleaning card, the user repeatedly plunges the cleaning card into (and out of) the feeder so as to at least partially clean surfaces of the rollers within the feeder (step 56). As set forth above, various cleaning strips (e.g., adhesive strips) may be provided on the cleaning card so as to capture dirt and debris which may be present on the rollers. Next, after the first end portion of the card cleaner has lost effective cleaning properties and/or is soiled with dirt and debris, the first end portion of the cleaning card is fully removed from the feeder (step 58). Then, the user may rotate the cleaning card 180°, exposing an unused second end portion of the cleaning card, including unused portions of the cleaning strips proximate the second end portion (step 60). As described above, this rotation of the cleaning card may either be about a single axis (as shown in FIGS. 1-3), or manually in a clamshell-type configuration (FIGS. 4-5).

Next, after the cleaning card is rotated 180°, the user may insert the unused second end portion of the cleaning card into the feeder (step 62), wherein the user then repeatedly plunges the second end portion of the cleaning card into the feeder so as to further clean the rollers or other surfaces to be cleaned within the feeder (step 64). Then, after the rollers or other surfaces are sufficiently cleaned and/or the second end portion of the cleaning card is also ineffective/soiled, the user removes the second end of the cleaning card from the feeder (step 66) to at least temporarily complete the cleaning operation using the handled plunger card device.

The methods and systems described above may result in significant time savings as compared to manual cleaning by qualified technicians of the rollers and/or other components accessible at feeders of various media handling devices. In addition, they can help ensure that cleaning of media entry/exit points of the media handling device occurs with more frequency, as a qualified technician is not needed to clean these entry/exit points accessible to the user during normal operation.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A cleaning system for cleaning a currency transport device comprising:
   a cleaning card, wherein the cleaning card comprises:
      a first end portion, and
      a second end portion; and
   a handled cleaning card holder, wherein the handled cleaning card holder is configured to secure the cleaning card at the first end portion and allow access to the second end portion of the cleaning card for use in cleaning, and further wherein the cleaning card is configured to be rotatable at least 180° within or upon the handled cleaning card holder.

2. The cleaning system of claim 1, wherein the cleaning card further comprises one or more cleaning strips extending between the first end and the second end, the one or more cleaning strips being positioned to align with at least one roller proximate a feeder of the currency transport device when the second end portion of the cleaning card is inserted within the feeder.

3. The cleaning system of claim 1, wherein the handled cleaning card holder further comprises a pin extending from a surface thereof, further wherein the pin is configured to secure the cleaning card about a single central axis to allow for at least 180° of rotation of the cleaning card about the pin.

4. The cleaning system of claim 1, wherein the handled cleaning card further comprises a first securing member and a second securing member, wherein at least one of the first securing member and the second securing member is hinged relative to the other of the first securing member and the second securing member.

5. The cleaning system of claim 4, wherein the first securing member and the second securing member are configured to be selectively coupled together in a first configuration so as to secure the cleaning card at the first end portion and allow access to the second end portion of the cleaning card for use in cleaning, and further wherein the first securing member and the second securing member are configured to be selectively separable so as to allow the cleaning card to be inserted or removed into the handled cleaning card holder.

6. The cleaning system of claim 5, wherein at least one of the first securing member and the second securing member comprises at least one pin and at least one of the first securing member and the second securing member comprises at least one hole, further wherein the at least one hole is configured to selectively engage the at least one pin so as to secure the first securing member and the second securing member together in a closed position.

7. The cleaning system of claim 1, wherein the one or more cleaning strips of the cleaning card comprises one or more adhesive strips.

8. The cleaning system of claim 7, wherein the one or more adhesive strips are offset from at least one surface of the cleaning card relative to one or more non-adhesive sections.

9. A cleaning card for cleaning a currency transport device comprising:
a first end portion having a first end;
a second end portion having a second end;
a plurality of cleaning strips extending between the first end and the second end; and
a plurality of non-cleaning strips spaced between the one or more cleaning strips, wherein:
the cleaning strips comprise a plurality of scarifying holes, wherein each scarifying hole comprises an opening configured to provide at least one scraping edge,
the non-cleaning strips comprise no scarifying holes, and
the spacing of the cleaning strips is configured to correspond to the spacing of one or more rollers, sensors, or lenses within a feeder of the currency transport device.

10. The cleaning card of claim 9, wherein the cleaning strips are offset from at least one surface of the cleaning card relative to the non-cleaning strips.

11. The cleaning card of claim 9, wherein the cleaning strips extend across only one side surface of the cleaning card.

12. The cleaning card of claim 9, wherein the cleaning strips extend across both side surfaces of the cleaning card.

13. The cleaning card of claim 9, wherein:
the cleaning strips further comprise an adhesive material; and
the non-cleaning strips comprise a non-adhesive material.

14. The cleaning card of claim 9, wherein:
the cleaning strips further comprise an abrasive material; and
the non-cleaning strips comprise a non-abrasive material.

15. The cleaning card of claim 9, wherein:
the cleaning strips further comprise an array of raised dots; and
the non-cleaning strips comprise a non-raised surface.

16. The cleaning card of claim 9, wherein:
the cleaning strips further comprise a plurality of discrete raised areas, wherein each discrete raised area comprises an apex; and
the non-cleaning strips do not include a plurality of discrete raised areas.

17. The cleaning card of claim 9, further comprising an opening extending through a central portion of the cleaning card, wherein the opening is configured to enable the cleaning card to be removably secured to a handled cleaning card holder about a single axis.

18. A cleaning card for cleaning a currency transport device comprising:
a first end portion having a first end;
a second end portion having a second end;
a plurality of cleaning strips extending between the first end and the second end;
a plurality of non-cleaning strips spaced between the one or more cleaning strips; and
an opening extending through a central portion of the cleaning card, wherein:
the opening is configured to enabled enable the cleaning card to be removably secured to a handled cleaning card holder about a single axis, and
the spacing of the cleaning strips is configured to correspond to the spacing of one or more rollers, sensors, or lenses within a feeder of the currency transport device.

19. The cleaning card of claim 18, wherein the cleaning strips are offset from at least one surface of the cleaning card relative to the non-cleaning strips.

20. The cleaning card of claim 18, wherein the cleaning strips extend across only one side surface of the cleaning card.

21. The cleaning card of claim 18, wherein the cleaning strips extend across both side surfaces of the cleaning card.

22. The cleaning card of claim 18, wherein:
the cleaning strips comprise an adhesive material; and
the non-cleaning strips comprise a non-adhesive material.

23. The cleaning card of claim 18, wherein:
the cleaning strips comprise an abrasive material; and
the non-cleaning strips comprise a non-abrasive material.

24. The cleaning card of claim 18, wherein:
the cleaning strips comprise an array of raised dots; and
the non-cleaning strips comprise a non-raised surface.

25. The cleaning card of claim 18, wherein:
the cleaning strips comprise a plurality of discrete raised areas, wherein each discrete raised area comprises an apex; and
the non-cleaning strips do not include a plurality of discrete raised areas.

* * * * *